United States Patent
Vanhollebeke

(10) Patent No.: US 11,384,742 B2
(45) Date of Patent: Jul. 12, 2022

(54) TORQUE SUPPORT ARRANGEMENT FOR A WIND POWER GEARBOX

(71) Applicants: ZF Friedrichshafen AG, Friedrichshafen (DE); ZF Wind Power Antwerpen N.V., Lommel (BE)

(72) Inventor: Frederik Vanhollebeke, Oudenaarde (BE)

(73) Assignees: ZF FRIEDRICHSHAFEN AG, Friedrichshafen (DE); ZF WIND POWER ANTWERPEN N.V., Lommel (BE)

( * ) Notice: Subject to any disclaimer, the term of this patent is extended or adjusted under 35 U.S.C. 154(b) by 142 days.

(21) Appl. No.: 16/765,170

(22) PCT Filed: Nov. 7, 2018

(86) PCT No.: PCT/EP2018/080413
§ 371 (c)(1),
(2) Date: May 19, 2020

(87) PCT Pub. No.: WO2019/101516
PCT Pub. Date: May 31, 2019

(65) Prior Publication Data
US 2020/0347829 A1    Nov. 5, 2020

(30) Foreign Application Priority Data
Nov. 24, 2017 (DE) .................... 10 2017 221 020.6

(51) Int. Cl.
*F03D 80/70*    (2016.01)
*F03D 15/00*    (2016.01)
*F16H 57/025*   (2012.01)

(52) U.S. Cl.
CPC ............. *F03D 80/70* (2016.05); *F03D 15/00* (2016.05); *F05B 2240/50* (2013.01); *F05B 2250/232* (2013.01); *F16H 57/025* (2013.01)

(58) Field of Classification Search
CPC .................. F03D 80/70; F05B 2240/50; F05B 2250/232; F05B 2240/54; F16H 57/025
(Continued)

(56) References Cited

U.S. PATENT DOCUMENTS

| 9,523,356 B2 | 12/2016 | Michalski |
| 2007/0292063 A1* | 12/2007 | Loheide ................ F16F 1/3842 384/222 |
| 2011/0308900 A1 | 12/2011 | Drewes |

FOREIGN PATENT DOCUMENTS

| CN | 104864013 A | 8/2015 |
| DE | 102006032525 A1 | 1/2008 |

(Continued)

*Primary Examiner* — Charles Reid, Jr.
(74) *Attorney, Agent, or Firm* — Leydig, Voit & Mayer, Ltd.

(57) ABSTRACT

A torque bracket arrangement for a wind power gearbox for transmitting a supporting force to a support structure of a wind power plant includes at least one radial support arm having an associated opening configured to receive a horizontal support pin. The at least one radial support arm is provided on a gearbox side and is configured to establish a detachable connection to at least one corresponding opening of a support eyelet unit arranged on the support structure. The at least one corresponding opening of the support eyelet unit includes an elastomer bearing bush into which the horizontal support pin is configured to be inserted. The elastomer bearing bush has differing rigidities depending on the load. The elastomer bearing bush consists of at least one soft region of low rigidity and at least one comparatively harder region of greater rigidity.

12 Claims, 2 Drawing Sheets

(58) Field of Classification Search
USPC .................................................. 290/44, 55
See application file for complete search history.

(56) References Cited

FOREIGN PATENT DOCUMENTS

| | | |
|---|---|---|
| DE | 102010044297 A1 | 3/2012 |
| DE | 102011053015 A1 | 2/2013 |
| DE | 102014215020 A1 | 2/2016 |
| WO | WO 2010060814 A1 | 6/2010 |

* cited by examiner

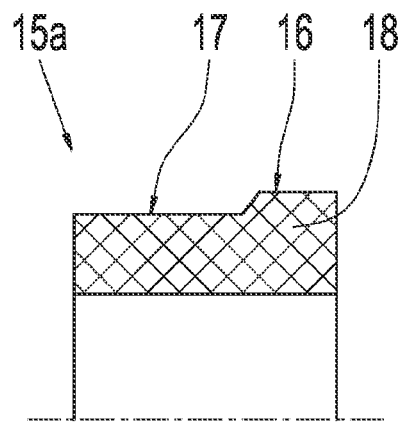
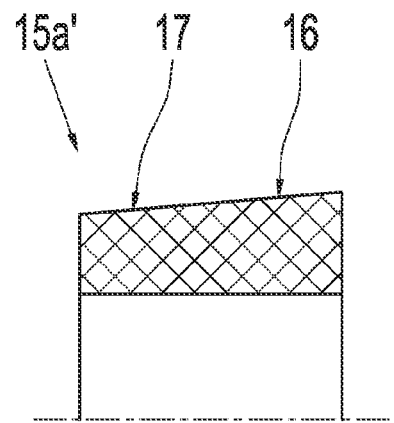
Fig. 3          Fig. 4
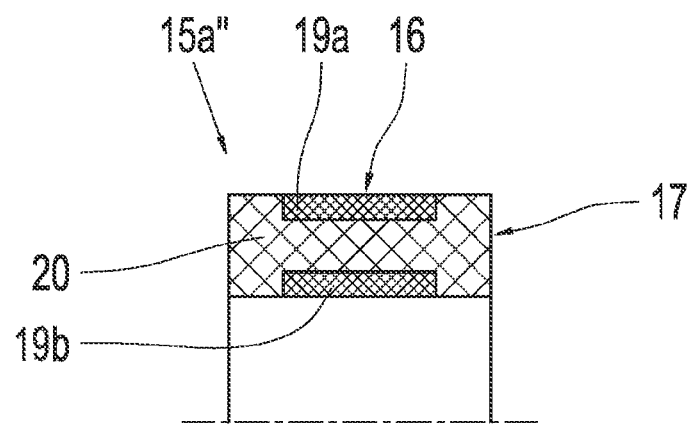
Fig. 5

TORQUE SUPPORT ARRANGEMENT FOR A WIND POWER GEARBOX

CROSS REFERENCE TO RELATED APPLICATIONS

This application is a U.S. National Stage Application under 35 U.S.C. § 371 of International Application No. PCT/EP2018/080413 filed on Nov. 7, 2018, and claims benefit to German Patent Application No. DE 10 2017 221 020.6 filed on Nov. 24, 2017. The International Application was published in German on May 31, 2019 as WO 2019/101516 A1 under PCT Article 21(2).

FIELD

The present invention relates to a torque bracket arrangement suitable for a wind power gearbox for transmitting a supporting force to a support structure of a wind power plant, wherein, on the gear side, at least one radial support arm having an associated opening for receiving a horizontal support pin is provided which establishes a detachable connection to at least one corresponding opening of a support eyelet unit arranged on the support structure. In addition to this, the invention also relates to a wind power plant for generating electrical energy, having a wind power gearbox which is equipped with such a torque bracket arrangement.

BACKGROUND

Wind power plants—in contrast to what are known as direct-drive turbines—are equipped with a gearbox, the wind power gearbox, arranged between the rotor and an electric generator for gearing up the rotor speed. The horizontal main shaft bearing of conventional wind power plants takes the form of a three- or four-point bearing, consisting of a torque bearing or two individual bearings, which fully transmits the arising weight forces as well as the yaw and pitch moments from the rotor into a machine frame. The machine frame forms the stationary support structure for the drive train of the wind power plant. Given the presence of the four-point bearing, a torque bracket arranged on the wind power gearbox need only transmit the reaction torque into the support structure. This four-point bearing avoids an introduction of weight forces and also yaw and pitch moments from the rotor into the wind power plant. Moreover, a gearbox replacement can be performed comparatively simply in the event of repairs. For this purpose, the torque bracket forms a detachable connection between wind power gearbox and support structure. To reduce vibrations, the torque bracket often includes at least one elastomer element situated in the line of torque for isolation of a vibration transmission into this support structure.

From DE 10 2010 044 297 A1, a torque bracket arrangement arises which is formed here from two pendulum supports arranged on both sides of a wind power plant. This type of torque bracket converts the reaction torque to be transmitted away from the wind power plant into tensile and compressive forces. While pendulum supports represent quite a flexible torque bracket with significant operating deformations, the rigidity in the transverse direction is very low. The type of vertically oriented torque bracket disclosed here is designed to stabilize torques on the order of approximately 3000 kNm. The torque bracket comprises a torque plate fastened to the housing of the wind power gearbox via a plurality of screws. During operation of the wind power plant, a reaction torque results from the rotational movement of the rotor, which movement is transmitted via the rotor hub to a drive shaft and via said drive shaft to the gearbox input of the wind power plant. This reaction torque is stabilized with respect to the machine frame of the wind power plant. The machine frame forming the support structure is a bed plate which is arranged in a nacelle of the wind power plant. The torque bracket substantially consists of the aforementioned torque plate, which opens into a U profile which rests against a damping element which transmits the support force to the support structure in the further course of the force progression.

DE 10 2014 215 020 A1, by contrast, discloses a generic torque bracket arrangement which is designed according to the bushing-bolt principle. At the housing of the wind power gearbox, a support arm extending radially therefrom is integrally formed and is provided with an opening for receiving a bolt. In the embodiment disclosed here, the wind power gearbox has two radial support arms which are arranged opposite one another on the housing, between which the reaction torque to be transmitted is divided. The horizontally running support pin establishes a detachable connection to a corresponding opening—not shown here—of a support eyelet unit of the support structure. In contrast to the pendulum supports described above, torque brackets of this type are exposed primarily to shearing and bending forces.

Wind power plants with a bearing design of the type described above have a natural vibration which may cause the entire drive train to start to roll from side to side. This vibration, which also affects the wind power gearbox, leads to large vertical forces in the direction of the support structure. If the sympathetic vibration is within the operating speed range of the wind power plant, this is also expressed in typically loud noise levels. These sympathetic vibrations typically occur when the wind speed drops, wherein the masking noise caused by the rotor blades is of low volume but causes a high resonance note.

SUMMARY

In an embodiment, the present invention provides a torque bracket arrangement for a wind power gearbox for transmitting a supporting force to a support structure of a wind power plant. The torque bracket arrangement includes at least one radial support arm having an associated opening configured to receive a horizontal support pin, the at least one radial support arm being provided on a gearbox side and being configured to establish a detachable connection to at least one corresponding opening of a support eyelet unit arranged on the support structure. The at least one corresponding opening of the support eyelet unit includes an elastomer bearing bush into which the horizontal support pin is configured to be inserted. The elastomer bearing bush has differing rigidities depending on the load. The elastomer bearing bush consists of at least one soft region of low rigidity and at least one comparatively harder region of greater rigidity.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 2 is a schematic longitudinal section through the torque bracket arrangement in

FIG. 1;

FIG. 3 is a detail of a longitudinal section of the elastomer bearing bush from FIG. 2;

FIG. 4 is a detail of a cross section of an elastomer bearing bush according to an alternative embodiment; and FIG. 5 is a detail of a cross section of an elastomer bearing bush according to a further alternative embodiment.

DETAILED DESCRIPTION

Figure 1:
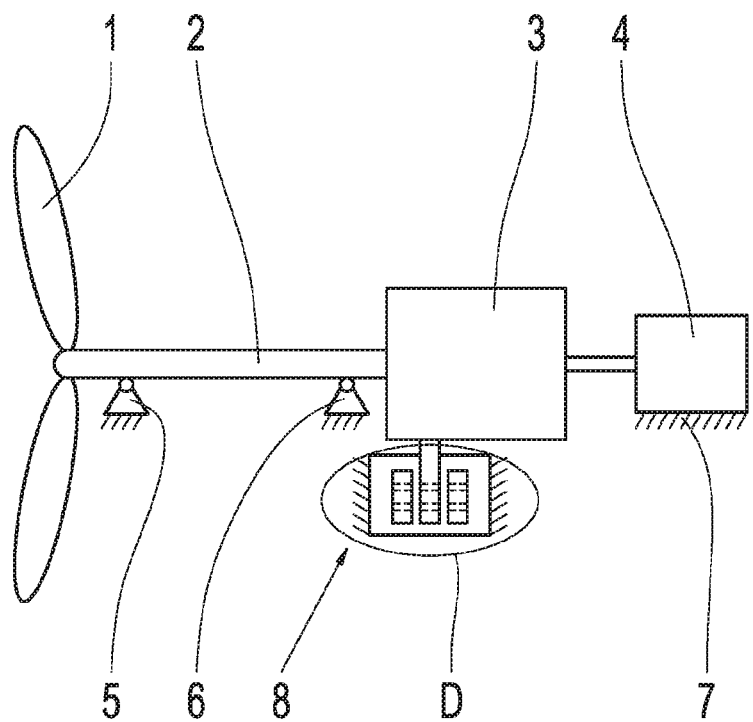
FIG. 1 is a schematic illustration of a drive train of a wind power plant having a wind power gearbox equipped with a torque bracket arrangement.

Disruptive sympathetic vibrations can be avoided if they are not excited by the wind power plant. Theoretically, it is possible to use a wind power gearbox whose excitation frequencies do not overlap with the natural vibrations of the drive train across the operating speed range. However, this severely limits the options when selecting the wind power gearbox. In addition to this, it is also conceivable to reduce the natural frequency leading to vibration of the drive train in such a way that it does not overlap with the excitation frequencies of the wind power gearbox across the operating speed range. However, this achievement is only possible if the mass of the wind power gearbox is greatly increased, or if the rigidity of the torque brackets is greatly reduced. For this purpose, the torque brackets would need to be mounted particularly softly. However, this measure also considerably reduces the service life of the torque brackets, so that this approach appears impractical.

The present disclosure describes torque bracket arrangements for a wind power gearbox for transmitting a supporting force to a support structure of a wind power plant which effectively reduces sympathetic vibrations of the drive train via simple technical means without negatively affecting the service life of the torque bracket arrangement.

The present disclosure incorporates the technical teaching that the at least one opening of the support eyelet unit is provided with an elastomer bearing bush whose rigidity varies depending on load and into which the support pin is inserted. This special elastomer bearing bush consists of a soft region of low rigidity and at least one comparatively harder region of greater rigidity.

In other words, an elastomer bearing bush with regions of differing rigidity is proposed with which a torque bracket whose effect varies depending on load can be realized. The regions of differing rigidity can be realized via the geometric design of the elastomer bearing bush.

The soft region of lower rigidity preferably establishes a permanent contact between the support arm and the support pin, so that this region ensures the transmission of force through the torque bracket in a low load range. By contrast, the hard region of greater rigidity only comes into contact with support arm and support pin as of a defined minimum load, so that this hard region ensures the transmission of force only as of a higher load. Given loads on the support bracket and lower rotational speeds, this measure leads to reduced sympathetic vibrations without hereby reducing the service life of the elastomer bearing bush. In this situation, the wear-causing load is low and a sufficient stabilization of torque still takes place. If the load on the torque bracket increases such that the defined minimum load is exceeded, this situation is expressed in that the hard region comes into contact with the support arm and the support pin, so that most of the force is transmitted through said hard region. In this situation, the high sympathetic vibrations associated with the high load are reduced at high rotational speeds. This ensures a long service life of the elastomer bearing bush because of the high rigidity acting in this situation. In this instance, it is possible to adapt the reduction of the sympathetic vibrations to the existing frequency spectrum of a wind power plant by changing the proportion of the soft region relative to the harder region. The adaptation may take place in such a way that the resonance is reduced only for those frequencies which would be excited in the event of a drop in speed, in order to eliminate particularly the noise that hereby occurs, without the service life of the elastomer bearing bush being negatively affected by the low rigidity of the soft region that is hereby active. The service life of the elastomer bearing bush is significantly dominated by operating situations with higher load, i.e. in particular in high-speed situations. The more wear-resistant, harder region of the elastomer bearing bush thus forms a kind of protective frame for the soft region of the elastomer bearing bush, which is preferably required for resonance damping in the event of rotational speed drops.

According to a preferred embodiment of the elastomer bearing bush for use in torque brackets on wind power gearboxes, it is proposed that the soft region of the elastomer bearing bush, which has differing rigidity depending on load, have a roll rigidity up to 50% lower than that of the hard region. This dimensioning represents an optimum between a reduction of typical sympathetic vibrations and a long service life. The rigidity of an elastomer bearing bush is usually expressed in Newtons per meter (N/m). If the distance between an elastomer bearing bush and a bolt is known, the roll rigidity resulting therefrom, expressed in Nm/rad, is more meaningful. In applications according to the disclosure, the roll rigidity is usually 4E8 Nm/rad to 4E9 Nm/rad, depending on the power class of the wind power plant, the number of bearing bushes etc. A roll rigidity of the soft region which is up to 50% lower leads to a theoretical maximum frequency reduction of up to approximately 30%. A frequency reduction by 15% already has a considerable influence on the resonance behavior, which is typically in a range between 40 Hz and 100 Hz>−15%>35 Hz to 85 Hz. This frequency reduction already leads to a noise shift into the inaudible range.

The region of lower rigidity should preferably be arranged in series with the hard region of higher rigidity. This makes it possible to ensure in a simple manner that the two different rigidity regions of the elastomer bearing bush act successively as desired as the load is increased or decreased. Very different design solutions are conceivable for a constructive realization of such a series arrangement. It is possible, for example, to form the soft region of lower rigidity through at least one outer ring integrally formed on a hollow cylindrical elastomer bearing bush. It would also be conceivable to design the soft region as an inner ring of a hollow cylindrical elastomer bearing bush with which the support pin would inasmuch come into contact. This exemplary embodiment of a design implementation of the achievement according to the present disclosure can be implemented with little manufacturing effort. In this instance, the elastomer bearing bush can consist overall of the same elastomer material, and the soft region of lower rigidity is produced by the geometry of the outer ring, whose height is less than the total height of the elastomer bearing bush. By varying the height of the outer ring relative to the height of the entire elastomer bearing bush, the elastomer bearing bush can be dimensioned in a simple manner with respective to the soft region in combination with the hard region.

In addition, the achievement according to the present disclosure can also be realized in terms of design in that the circumferential surface or the opening of the elastomer bearing bush is conical. In this embodiment, as load increases, the support eyelet unit or the support pin come into contact with increasingly more of the material of the elastomer bearing bush of the conical region, increasing the rigidity of the bearing.

According to another preferred embodiment, it is proposed that the elastomer bearing bush have a soft region which is formed by an inner radial and/or outer radial soft elastomer ring inserted into a hard elastomer body having an essentially H-shaped cross section. It is also conceivable to omit the soft elastomer ring, the function of which is then taken over by an equivalent circumferential groove. Given a low load, the rigidity of the elastomer bearing bush is substantially determined by the two narrow hard elastomer faces at the edge side and by the at least one soft elastomer ring or the at least one circumferential groove. Given a high load, the soft elastomer ring—if present—is compressed and the rigidity of the elastomer bearing bush, which has differing rigidity depending on load, increases.

Preferably, the at least one opening of the support eyelet unit should have a diameter which is greater than the diameter of the opening in the support arm in order to receive the elastomer bearing bush. In conjunction with this, the support pin interacts directly with the opening on the support arm, wherein the connection is preferably designed as a press fit. The position of the support pin can be additionally secured by means of retaining rings or the like.

According to a preferred embodiment, the support eyelet unit consists of two support eyelets arranged parallel to and spaced apart from one another, in the gap between which the support arm engages. In this instance, the opening in the support arm and the at least one opening of the support eyelet unit are in congruent alignment with one another in order to receive the support pin. In this embodiment, two elastomer bearing bushes are used, each of which is associated with one support eyelet of the support eyelet unit. The two elastomer bearing bushes are hereby preferably designed identically and have an additive effect.

According to FIG. 1, a drive train of a wind power plant schematically illustrated here comprises a wind-impingible rotor 1 whose rotational movement is supplied via a rotor shaft 2 to the input side of a wind power gearbox 3. At the output side, the wind power gearbox 3 drives an electric generator 4 for generating electrical energy at a higher rotational speed. The rotor shaft 2 is supported at multiple places, namely by a fixed bearing 5 on the rotor side and by a movable bearing 6 on the gearbox side. The fixed bearing 5, the movable bearing 6, the generator 4, and the gearbox 3 are supported by a support structure 7 (indicated schematically). For this purpose, the wind power gearbox 3 is provided with a torque bracket arrangement 8.

Figure 2:
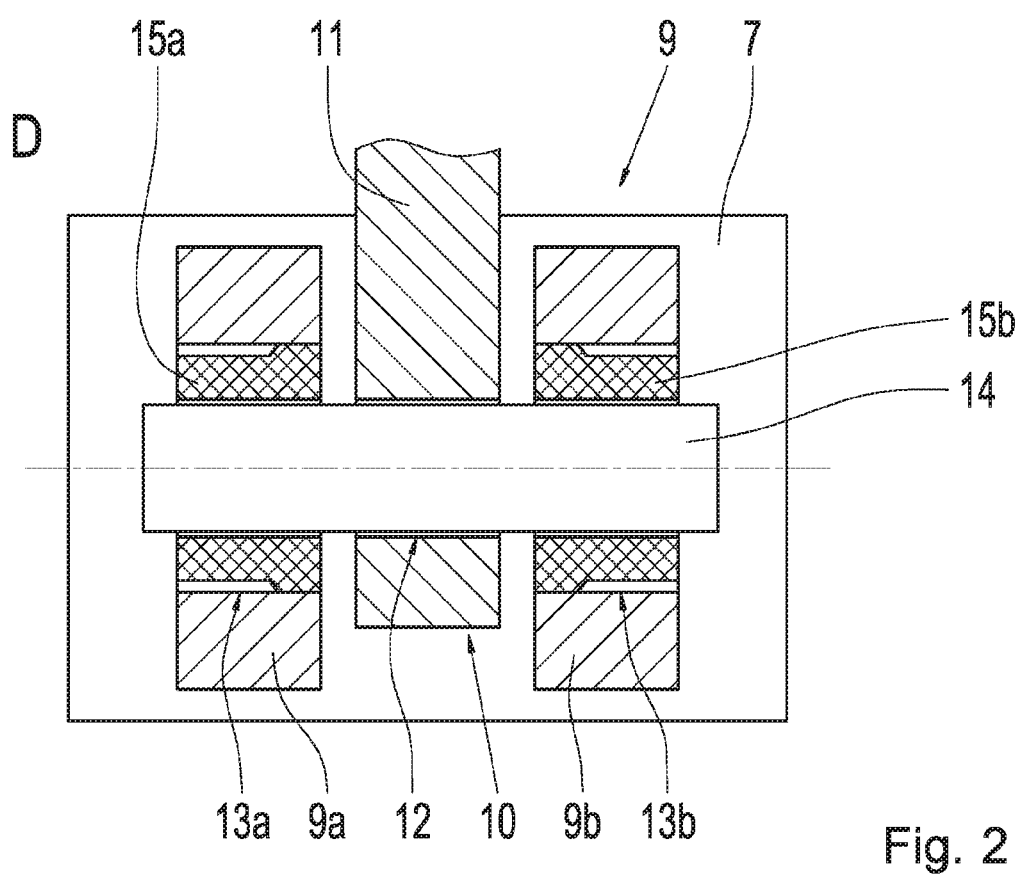

FIG. 2 shows a close-up view of detail D from FIG. 1. The torque bracket arrangement shown in detail in FIG. 2 consists substantially of a support eyelet unit 9, which here consists of two support eyelets 9a and 9b arranged parallel to and spaced apart from one another, which are fastened to the support structure 7 of the wind power plant. The two support eyelets 9a and 9b form a gap 10 in which a support arm 11 integrally formed on the housing of the wind power gearbox 3 engages in such a way that its opening 12 is in congruent alignment with openings 13a and 13b of the support eyelets 9a or 9b. The two support eyelets 9a and 9b of the support eyelet unit 9 and the support arm 11 of the wind power gearbox 3—not further shown—are manufactured from a machined steel material, wherein the openings 12, 13a, and 13b are produced by drilling.

A cylindrical support pin 14 also made of steel is connected to the opening 12 in the support arm 11 by press fitting. The legs of the support pin 14 on both sides project through the openings 13a and 13b of the two support eyelets 9a or 9b, wherein a special elastomer bearing bush 15a or 15b is respectively arranged between them. For the purpose of receiving the two elastomer bearing bushes 15a and 15b, the two openings 13a and 13b of the support eyelet unit 9 have a diameter which is greater than the diameter of the opening 12 in the support arm 11.

According to FIG. 3, the elastomer bearing bush 15a shown here by way of example has a soft region 16 of low rigidity and a region 17 of higher rigidity arranged adjacent thereto. In this instance, the region 16 of low rigidity is in permanent contact with the support eyelet—not further shown here.

In contrast to this, the comparatively harder region 17 only comes into contact with the support eyelet as of a defined minimum load. This is achieved in that the soft region 16 of lower rigidity is formed by an integrally molded outer ring 18. The soft region 16 is formed by the outer ring 18, which is narrower relative to the overall length of the elastomer bearing bush 15a.

In the exemplary embodiment according to FIG. 4, the outer circumferential surface of the elastomer bearing bush 15a' is conical, so that a gradual transition takes place from the soft region 16 to the hard region 17.

In the exemplary embodiment according to FIG. 5, the elastomer bearing bush 15a" has a centrally arranged soft region 16 which is formed by an inner radial and an outer radial soft elastomer ring 19a or 19b inserted into a hard elastomer body 20 having a substantially H-shaped cross section. This can optionally also be omitted. The hard region 17 is thus located in the core of this elastomer bearing bush 15e.

The invention is not limited to the above-described preferred exemplary embodiments of an elastomer bearing bush. Rather, modifications thereof are also conceivable which are encompassed by the scope of protection of the following claims. Thus, the different regions of the correspondingly varyingly stiff elastomer bearing bush can also be formed on the inner wall thereof and inasmuch interact with the support pin.

In addition, it is also possible to design the rigidity of the elastomer bearing bush by selecting different materials according to the requirements. In this way, the soft region of the elastomer bearing bush can be formed from an elastomer material with a lower Shore hardness than that of the comparatively harder region. Such an elastomer bearing bush can be executed both as one piece and in multiple parts. For example, a soft elastomer ring can thereby be pushed onto a hard elastomer ring. In event of wear, the soft elastomer ring would need to be replaced, by contrast to which the hard elastomer ring can continue to be used.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

1 Rotor
2 Rotor shaft
3 Wind power gearbox
4 Electrical generator
5 Fixed bearing
6 Movable bearing
7 Support structure
8 Torque bracket arrangement
9 Support eyelet unit
10 Gap
11 Support arm
12 Opening
13 Opening
14 Support pin
15 Elastomer bearing bush
16 Soft region
17 Hard region
18 Outer ring
19 Soft elastomer ring
20 Hard elastomer body

The invention claimed is:

1. A torque bracket arrangement for a wind power gearbox for transmitting a supporting force to a support structure of a wind power plant, the torque bracket arrangement comprising:
at least one radial support arm having an associated opening configured to receive a horizontal support pin, the at least one radial support arm being provided on a gearbox side and being configured to establish a detachable connection to at least one corresponding opening of a support eyelet unit arranged on the support structure,
wherein the at least one corresponding opening of the support eyelet unit includes an elastomer bearing bush into which the horizontal support pin is configured to be inserted,
wherein the elastomer bearing bush has differing rigidities depending on a load, and
wherein the elastomer bearing bush consists of at least one soft region of low rigidity and at least one comparatively harder region of greater rigidity.

2. The torque bracket arrangement according to claim 1, wherein the soft region of lower rigidity is configured to establish a permanent contact between the support eyelet unit and the support pin, and
wherein the hard region of higher rigidity is configured to contact the support eyelet unit and the support pin only under a defined minimum load.

3. The torque bracket arrangement according to claim 1, wherein the soft region of the elastomer bearing bush has a roll rigidity that is up to 50% lower than that of the hard region.

4. The torque bracket arrangement according to claim 1, wherein the soft region of low rigidity is arranged in series with the hard region of higher rigidity.

5. The torque bracket arrangement according to claim 4, wherein the soft region of lower rigidity is formed by at least one outer ring integrally formed on a hollow cylindrical elastomer bearing bush.

6. The torque bracket arrangement according to claim 1, wherein the inner and/or outer circumferential surface of the elastomer bearing bush is conical.

7. The torque bracket arrangement according to claim 1, wherein the elastomer bearing bush has a soft region which is formed by an inner radial and/or outer radial soft elastomer ring inserted into a hard elastomer body having a substantially H-shaped cross section, or by a circumferential groove.

8. The torque arrangement according to claim 1, wherein the at least one opening of the support eyelet unit has a diameter which is greater than the diameter of the opening in the support arm in order to receive the elastomer bearing bush.

9. The torque bracket arrangement according to claim 1, wherein the support pin forms a press fit with the opening in the support arm.

10. The torque bracket arrangement according to claim 1, wherein the support eyelet unit consists of two support eyelets arranged parallel to and spaced apart from one another, in a gap between which the support arm engages in such a way that the opening in the support arm is in congruent alignment with the openings at the support eyelets.

11. The torque bracket arrangement according to claim 1, wherein the support eyelet unit and the support arm are manufactured from a machined steel material.

12. A wind power plant for generating electrical energy, the wind power plant comprising:
a wind power gearbox mounted on a support structure, and
at least one torque bracket arrangement according to claim 1,
wherein the at least one torque bracket arrangement is arranged between the wind power gearbox and the support structure.

* * * * *